April 20, 1965   C. VINTEN ET AL   3,179,029
CAMERA SHUTTER MECHANISMS
Filed Sept. 27, 1962   3 Sheets-Sheet 1
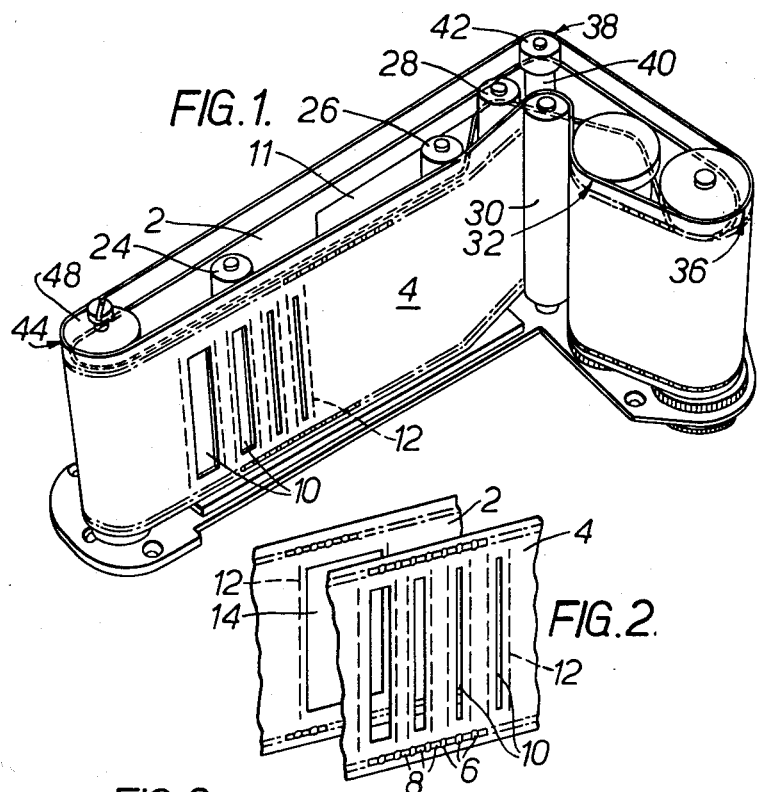
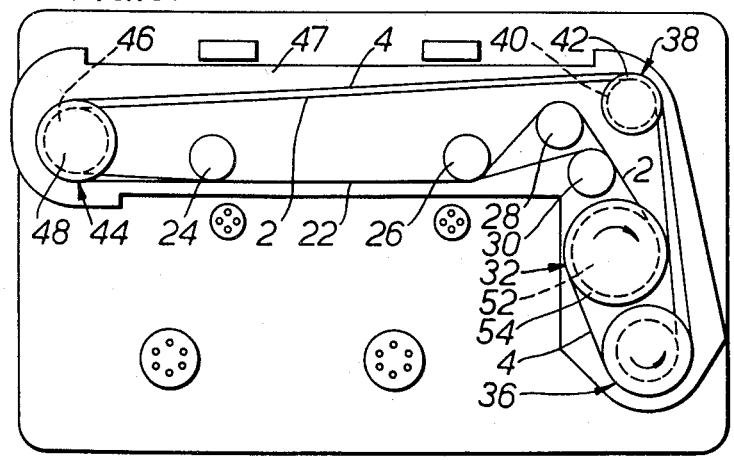
INVENTORS
CHARLES VINTEN
IVOR JOSEPH DUNNINGHAM
By Shoemaker and Mattare
ATTYS.

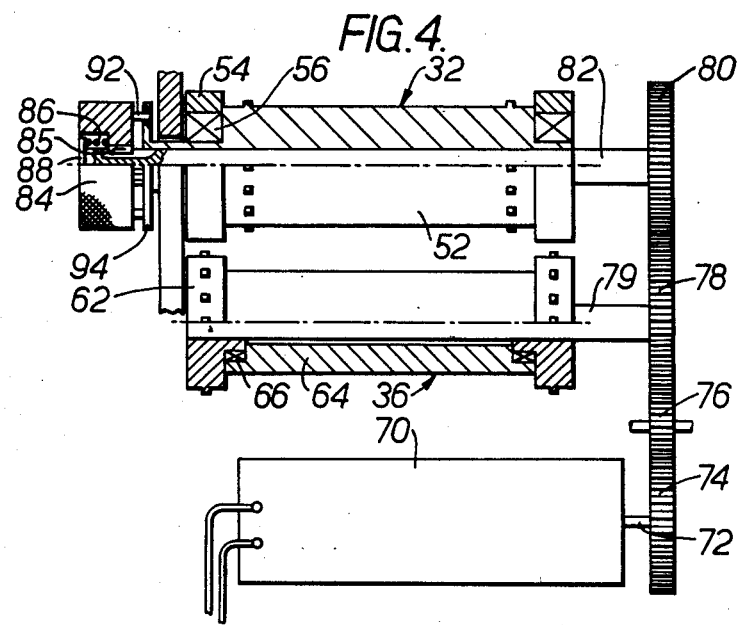
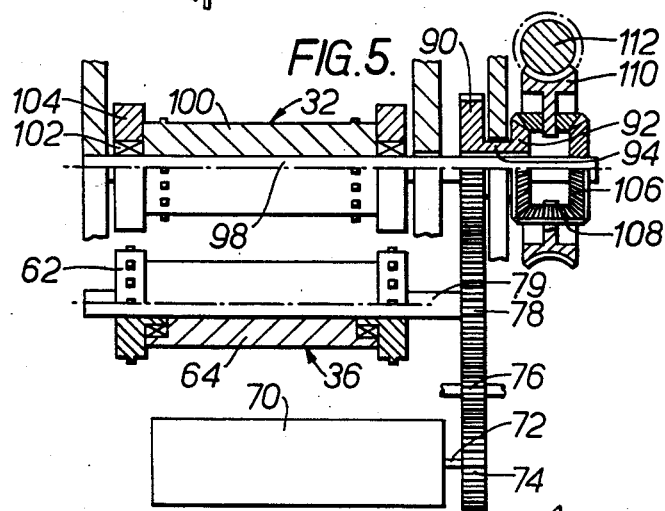

April 20, 1965     C. VINTEN ET AL     3,179,029
CAMERA SHUTTER MECHANISMS
Filed Sept. 27, 1962     3 Sheets-Sheet 3
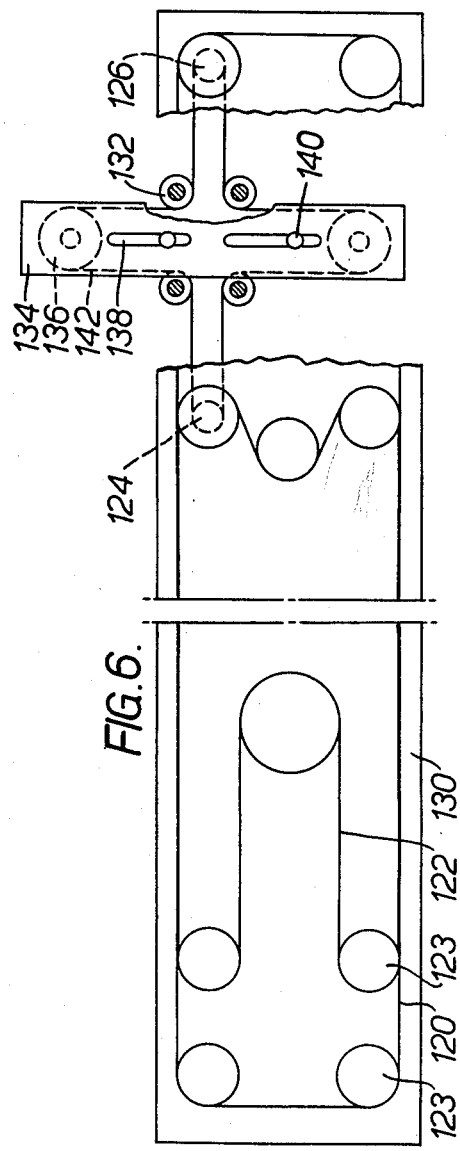
INVENTORS
CHARLES VINTEN
IVOR JOSEPH DUNNINGHAM
By Shoemaker and Mattare
ATTYS.

United States Patent Office 3,179,029
Patented Apr. 20, 1965

3,179,029
CAMERA SHUTTER MECHANISMS
Charles Vinten and Ivor Joseph Dunningham, London, England, assignors to W. Vinten Limited, London, England
Filed Sept. 27, 1962, Ser. No. 226,503
Claims priority, application Great Britain, Sept. 27, 1961, 34,758/61
15 Claims. (Cl. 95—57)

The present invention relates to camera shutter mechanisms, and particularly to focal plane shutter mechanisms. The shutter of the present invention is particularly suitable for aerial cameras.

A shutter mechanism is known including an endless band movable in a closed path which intersects the focal axis of the camera twice, the shutter having in it a narrow aperture and a wire aperture separated by unequal lengths axially of the band and mounted so that light passes through the aligned apertures only when the narrow aperture is traversing that part of the path of the band which intersects the focal axis and which is adjacent the film carrier. Such known shutters suffer from the disadvantage that the time of exposure is constant for a constant speed of travel of the exposure slit during exposure of the film whereby the only means of varying the effective exposure time is to vary the speed of travel of the exposure slit.

Accordingly the present invention aims at providing a shutter mechanism in which the exposure time of a camera incorporating the mechanism is variable with a constant speed of travel of the exposure slit during exposure of the film.

Accordingly the present invention provides a focal plane shutter mechanism for a camera, including a pair of opaque endless flexible bands designed to move along a closed path intersecting the focal axis of the camera twice, each band including at least one narrow aperture extending perpendicularly to the direction of movement of the band, and a wide aperture having its transverse edges spaced from the narrow aperture or apertures by different amounts, the pair of bands being arranged so that a narrow aperture in one band is in alignment with a narrow aperture in the other band to provide an exposure slit during movement of the aligned narrow apertures along a first portion of the path which intersects the focal axis, and so that the wide apertures are aligned with each other and extend over a second portion of the path intersecting the focal axis during movement of the exposure slit along the first portion of the path, the mechanism being designed to be mounted on a camera with the first portion adjacent to the film and the second portion adjacent to the lens system to permit light to fall through both pairs of aligned apertures on to the film, the mechanism being such that light is prevented from reaching the film at all other positions of the apertures, the mechanism including means to displace the pair of bands axially relatively to each other to vary the effective width of the exposure slit.

By "narrow aperture" and "wide aperture" throughout this specification is meant respectively apertures having their major dimensions extending transversely to and parallel with the axis of the band.

Preferably one band has three or more narrow apertures with their centre lines spaced apart by equal amounts along the length of the band and the other band has only one narrow aperture of greater width axially of the band than the widest of the group of narrow apertures in the other band. With this arrangement the bands are able to be displaced relatively to each other by discrete steps corresponding in length to the spacing apart of the narrow apertures in the group of apertures whereby one or other of the narrow apertures is in alignment with the narrow aperture in the other band to form a series of exposure slits, each of different width.

Alternatively each band may have only one narrow aperture in it, the exposure slit being formed by the narrow apertures overlapping each other to a greater or lesser extent. With this arrangement the bands may be continuously displaced relatively to each other to form an exposure slot having a width lying within a range of widths.

In one example of shutter mechanism of the present invention, the mechanism includes a mount for the lens assembly of the camera and a platform for the film supporting and advancing mechanism, connections being provided between the film advancing mechanism and the shutter member so that their movements are synchronised.

Examples of the present invention will now be described with reference to the accompanying drawings, in which:

FIG. 1 is a view in perspective of one form of shutter mechanism with an end plate removed to show the band supporting rollers and driving sprockets;

FIG. 2 is a diagrammatic view in perspective of portions of the pair of bands of the shutter mechanism shown in FIG. 1, the portions containing the narrow apertures, with the spacings between the bands exaggerated to illustrate their construction;

FIG. 3 is a plan view of the mechanism shown in FIG. 1 showing the paths of the two bands around the various rollers and sprockets;

FIG. 4 is a view, part in section and part in elevation, of one method of achieving relative motion between the driving sprockets of the shutter mechanism shown in FIG. 1;

FIG. 5 is a view, part in section and part in elevation, of a second form of means for achieving relative motion between the driving sprockets of the mechanism shown in FIG. 1, and FIG. 6 is a plan view of a second form of shutter mechanism showing the paths of the pair of bands.

In the mechanism shown in FIG. 1 the inner band 2 is narrower than the outer band 4. Both bands are made from opaque material in the form of rubberized fabric. Each band has its edges perforated to co-operate with a driving sprocket, to be described later, and for resistance against tearing the edges of the perforations 6 are reinforced by means of small metal clips 8 which extend between adjacent perforations and embrace the adjacent edges thereof. The transverse edges of the apertures in the bands are reinforced by means of wire inserts 12 incorporated in the rubberized fabric during manufacture thereof.

The inner band 2 has only one narrow aperture 14 and a wide aperture 11, the two apertures being spaced apart by unequal opaque portions of lengths such that the apertures are in alignment only when the narrow aperture is passing between a pair of idling rollers 24 and 26. The outer band 4 has one wide aperture and a plurality of narrow apertures 10. The two bands are arranged to be displaced axially relatively to each other to bring the narrow aperture 14 selectively into alignment with the narrow apertures 10 to furnish an exposure slit. The wide apertures in the bands are of the same length so that light is able to pass through both pairs of aligned apertures when the exposure slit is scanning the film, i.e. when passing between the rollers 34 and 26.

The centre lines of the group of narrow apertures 10 are spaced apart by equal amounts. It is preferred to make the widths of the apertures increase progressively in the proportion N, 2N, 4N and 8N. In one example $N=0.044$ inch. As shown more clearly in FIG. 2 the inner band 2 has only one narrow aperture 14 of width greater than the width of the largest of the group of narrow apertures 10. As will be described more fully below the bands 2 and 4 are moved in discrete intervals by amounts equal to the spacing between the centres of the narrow apertures 10 whereby each narrow aperture 10 can be placed selectively in alignment with the narrow aperture 14 in the inner band to form an exposure slit of effective width defined by the width of the aperture 10.

The paths of the bands are shown more clearly in FIG. 3. As shown in this figure both bands extend in contact with each other over a portion 22 of the path of the bands, the path being defined by the position of the pair of idling rollers 24 and 26. As shown in the figure the direction of movement of the two bands is from left to right. Immediately after leaving the roller 26 the bands 2 and 4 diverge until they pass over another pair of idling rollers 28 and 30. From these rollers both bands pass over an inner band driving member 32, of which two forms are illustrated more completely in FIGS. 4 and 5.

From the inner band driving member 32 both bands pass to an outer band driving member 34 whose detailed construction is also shown in FIGS. 4 and 5.

Both driving members 32 and 36 include roller members so that the band not being driven is clear of the teeth on the driving sprocket, the roller members being coaxial with the driving sprocket itself and being free to rotate relatively thereto.

From the outer band driving members 36 both bands proceed to a guide member 38 in the form of an inner cylindrical roller 40, over which the inner band passes, and two end rollers 42 able to rotate relatively to the cylinder 40 and designed to be contacted by the edges of the outer band 4. From the double guide member 38 both bands proceed to a similar guide member 44 including an inner cylindrical roller 46 for the inner band and two end rollers 48 for the edges of the outer band.

Leaving the guide member 44 both bands pass to the first idling roller 24 at which they are brought into contact with each other.

All the rollers and sprockets are supported at both ends in end plates 47, of which the top one has been removed in FIG. 2 to show the positioning of the sprockets and rollers and the paths of the bands 2 and 4.

In the example shown in FIG. 4 the inner band driving member 32 is in the form of a cylindrical sprocket 52 supporting on its ends, by bearings 56, a pair of rollers 54. The cylindrical surfaces of the rollers 54 stand above the cylindrical surface of the sprocket 52 so that when the inner band passes over the sprocket 52 the outer band is supported by its edges riding on the rollers 54 with the two bands out of contact with each other.

The outer band driving member 36 is of similar construction to driving member 32 and includes a pair of sprockets 62 designed to engage the perforations in the edge of the outer band 4, and extending between them an idling cylinder 64 mounted for movement relatively to sprocket 62 by bearings 66. The radial distances of the curved surfaces of the sprocket 62 and the cylinder 64 are again such that when both bands are engaged by the driving member 36 they are out of contact with each other.

From the paths of the bands as indicated in FIG. 3 it will be seen that when the driving sprocket 52 is driven in a clockwise direction the rollers 54 move in an anti- clockwise direction, and that both the driving sprockets and the idling cylinder of driving member 36 rotate in the same direction but at different angular speeds.

In the example of mechanism shown in FIG. 3 both bands are of the same length, and the position and sizes of the various rollers and driving members are such that the total path length of each band is the same. Thus when the driving members 32 and 36 are driven at the same angular speed the two bands move in unison over that portion 22 of the path which is adjacent to the film carrier.

An essential feature of the arrangement shown in FIGS. 1 and 2 is that the bands 2 and 4 are moved at discrete steps relatively to each other. One means which may be referred to as a stepwise adjustment mechanism for doing this is shown in FIG. 4. With this arrangement both band driving members 32 and 36 are driven by means of an electric motor 70 of known type. The shaft 72 of the motor drives a gear wheel 74 meshing with an idler roller 76 meshing in turn with a spur gear 78 attached to the shaft of the outer band driving member 36, and meshing in turn with a spur gear 80 attached to the driving shaft of the inner band driving member 32. Meshing of the spur gears 78 and 80 ensures that the driving members 32 and 36 rotate in opposite directions. The diameters of the spur gears 78 and 80 are equal, as are also the diameters of the respective driving sprockets 62 and 52, so that the linear speeds of the bands are always equal.

The outer band driving sprockets 62 of the member 36 are keyed to the shaft 79 and mounted on them for movement relatively thereto is the cylinder 64 supporting the inner band.

Mounted on the shaft 82 extending from the spur gear 80 is a knob 84. The knob 84 works on splines 85 formed in the shaft 82 so that it is not able to rotate relatively to the shaft 82 but is able to move axially thereof, being biassed towards the driving member 32 by means of a compression spring 86 extending between a flange 88 on the end of the shaft 82 and an inner surface 90 of the knob. Extending from an inner surface of the knob 84 in parallel with the axis of the shaft 82 is a pair of pins 92 adapted to engage in holes formed in a circular plate 94 which is integral with the driving sprocket 52 of the driving member 32. Thus it will be seen that the spur gear 80 drives the spocket 52 through the parts: shaft 82, splines 85, knob 84, pins 92, plate 94 and sprocket 52.

The plate 94 is provided with a series of apertures spaced angularly around it at intervals such that the pins 92 projecting from the knob 84 are able to be brought into selective engagement therewith. It will therefore be seen that when the knob is moved axially outwardly of the shaft 82 the pins 92 can come out of engagement with the plate 94 to permit the shaft 82, and thereby the driving sprocket 62 of the outer band driving member 36, to be rotated relatively to the stationary inner band driving sprocket 52. Thus the knob 84 can be rotated to a position in which the pins 92 can be engaged in a second set of holes to effect the required axial displacement between the bands 2 and 4 in engagement with the respective sprockets of the driving members 32 and 36.

In FIG. 5 is illustrated means for effecting continuous differential movement of the two bands. This mechanism is suitable for the modification of the invention in which only one narrow aperture is provided in each band, the exposure slit being formed by the narrow apertures overlapping each other to a greater or lesser extent. In this embodiment those members which are identical with those shown in FIG. 4 have been given the same references.

In this embodiment the outer band driving member 36 is driven by the electric motor 70 through shaft 72, gear 74 meshing with gear 76 which meshes in turn with gear 78 attached to a shaft 79 connected to the driving sprocket member 62 of the member 36.

The gear 78 meshes with a gear 90 which is integral with a bevel gear 92, the two gears being spaced apart by a sleeve portion 94 which acts as a bearing, the sleeve rotating in an aperture in a frame member 96. Mounted for rotation relatively to and coaxially of the gear 90 is a shaft 98 to which an inner band driving sprocket 100 is secured. Mounted at each end of the sprocket 100 for rotation relatively thereto, on bearings 102, are roller members 104 on which the sides of the wider band are supported clear of the teeth on the sprocket member 100.

On the end of the shaft 98 opposite to the inner band driving member 32 is a second bevel gear 106. In engagement with the bevel gears 92 and 106 is a plurality of planetary bevel gears 108 supported by a cage 110. The cage 110 is circular and its outer cylindrical surface is formed with a spiral gear engaged by a worm gear 112 mounted for rotation on the frame of a camera by known means. The worm 112 is rotated by means of a knob (not shown).

It will be seen that the arrangement of bevel and planetary gears acts as a conventional differential gear. When gear 90 is stationary rotation of the worm gear 112 is effective to rotate the cage 110 to cause the planetary gears 108 to rotate the bevel gear 106, and hence the shaft 98, relatively to the stationary bevel gear 92. Thus the driving sprocket 100 of the inner band driving member 32 is rotated relatively to those of the outer band driving member 36 to effect a smooth and variable displacement of the two bands engaged by the sprockets.

In FIG. 6 is shown a form of the invention in which the outer band 120 travels in a substantially rectangular path and the inner band 122 travels in a path having two straight parallel portions interconnected by two sinuous portions. Both bands have only one narrow and one wide aperture. It is arranged that the length of the sinuous path of the inner band from $a$ to $b$ is less than the length of the path of the inner band from $c$ to $d$. In addition the length of the path of the outer band 120 from $a$ to $b$ is less than the same length of the path of the inner band. The total lengths of the two bands are equal and they are driven at equal speeds whereby the bands move in unison over those portions of the combined path in which they are parallel, i.e. from $d$ to $a$ and from $b$ to $c$. The shutter mechanism is arranged so that when the narrow apertures are traversing the path from $d$ to $a$, and in that direction, the wide apertures are traversing the path from $b$ to $c$. The effective exposure slit is determined by the degree of overlap of the narrow apertures in the bands and the length of the wide apertures is chosen so that light falls on a film extending adjacent the path from $d$ to $a$ at all times that the exposure slit is traversing this same part of the path.

By virtue of the differences of path lengths from $a$ to $b$ of the inner and outer bands, the bands are moved axially relatively to each other so that the narrow apertures are not in register with each other when travelling of the portion of the path from $b$ to $c$. By virtue of the fact that both bands are of the same length the bands are restored to be in register with each other to form the exposure slit after both bands have traversed their respective part of the paths from $c$ to $d$.

In FIG. 6 is illustrated diagrammatically one means of effecting variation of the width of the exposure slit. The inner band 122 passes over a driving sprocket 124 and the outer band passes over a driving sprocket 126. Extending axially of each sprocket is a gear wheel 128. Mounted on the frame 130 of the shutter mechanism are four idler gears 132. Slidably mounted on the support 130 is a member 134 carrying two idler gears 136 at its ends. The carrier member is provided with two slots 138 extending axially of its length. Projecting through each slot is the shank of a screw 140 working in the frame 130, by means of which screw the carrier member 134 can be locked against movement relatively to the frame 130. A conventional roller chain 142 is trained over the driving gears 128 and the idler gears 132 and 136. The sprocket 126 is driven directly by a camera motor and the sprocket 124 is driven by means of the chain 142. The path of the chain is cruciform. From the geometry of the arrangement as illustrated it will be seen that when the carrier member moves perpendicularly to the line joining the two driving sprockets 124 and 126 the length of chain remains constant and the two sprockets are rotated relatively to each other to vary the overlap of the narrow apertures. The position of the carrier member 134 relatively to the frame 130 can be calibrated to enable any desired width of the exposure slot within the limits of variation to be selected.

Both types of shutter mechanisms as shown in FIGS. 1 to 6 may be driven at a continuous speed to give a desired exposure time for a constant size of exposure slit; variations of the exposure time being provided by varying the width of the exposure slit as described above. However it is preferred to use a pulsing technique. With this technique the camera motor is designed to drive the shutter during the exposure cycle at a desired speed. At the beginning of each exposure cycle the motor is energised by a voltage pulse of sufficient duration to cause the exposure slit to traverse the film. The motor thus accelerates the bands to the operating speed prior to movement of the exposure slit across the film carrier. After the exposure the motor is de-energised whereby the bands are stopped or slowed down until the motor is again energised to accelerate the bands to the operating speed for the succeeding exposure cycle. Means may be provided to pulse the motor manually or at pre-set speeds, for example at four or eight frames per second. When using the pulsing technique it is desirable to reduce the inertia of all moving parts in the shutter mechanisms as much as possible by the use of anti-friction bearings and lightweight materials of low inertia.

It is intended that the shutter mechanism of the present invention be made as a complete unit in itself to permit substitution in known cameras for known shutter mechanisms to give such cameras the facility of enabling the exposure time to be varied for a constant speed of travel of the exposure slit across the film carrier.

We claim:

1. A focal plane shutter mechanism for an aerial camera and the like, including a pair of endless opaque flexible bands designed to move along a closed path intersecting the focal axis of the camera twice, each band having in it a narrow aperture extending perpendicularly to the direction of movement of the band, and a wide aperture having its transverse edges spaced from the narrow aperture by unequal amounts, the pair of bands being disposed so that the narrow apertures in the bands are in alignment and overlap to provide an exposure slit during movement of the narrow apertures along a first portion of the path intersecting the focal axis, and so that the wide apertures are aligned with each other and extend over a second portion of the path intersecting the focal axis during movement of said exposure slit along said first path portion, whereby when the mechanism is drivably mounted in a camera having a travelling film and a lens system, with said first path portion adjacent to the film and said second path portion adjacent to the lens system, light is permitted to fall through both pairs of aligned apertures onto the film, the path of the inner band having a convoluted portion at each side of the focal axis, the lengths of the convoluted portions being unequal whereby the narrow apertures are displaced out of alignment with each other during movement of the narrow apertures along said second path portion whereby the film is masked at all other positions of the mechanism, the mechanism including means to displace the pair of bands axially relatively to each other to vary the effective width of the exposure slit.

2. A mechanism as claimed in claim 1, in which each band is engaged by a driving member of which one is operatively connected to a driving motor for the camera and of which the other is connected to said motor through a differential mechanism.

3. A repetitively operable focal plane shutter mechanism for a sequence camera comprising a pair of endless opaque flexible bands, guide means located to cause each of the bands to move along a closed path first and second portions of which intersect the focal axis of the camera at right angles, one band having a narrow aperture extending perpendicularly to the direction of movement of the band, and a wide aperture having its transverse edges spaced from the narrow aperture by unequal amounts, and the other band having a plurality of narrow apertures of different widths spaced longitudinally of the band, and a wide aperture spaced from the edges of each of the endmost of the plurality of narrow apertures by unequal amounts, the pair of bands being disposed in relation to each other so that the narrow aperture in said one band is in alignment with only one narrow aperture of the said plurality of apertures in the other band to provide an exposure slit during movement of the narrow apertures along a first portion of the path intersecting the focal axis, and so that the wide apertures are aligned with each other and extend over a second portion of the path intersecting the focal axis only during movement of said exposure slit along said first path portion, whereby when the mechanism is drivably mounted in a camera having a travelling film and a lens system, with the said first path portion adjacent to the film and the said second path portion adjacent to the lens system, light is permitted to fall through both pairs of aligned apertures onto the film, the first mentioned unequal amounts and second mentioned unequal amounts being such that when the aligned narrow apertures providing an exposure slit move along the said second portion of the path, an opaque portion of at least one of the bands occupies the said first portion of the path, and when the aligned wide apertures move along the said first portion of the path, an opaque portion of at least one band occupies the said second portion of the path so that the film is masked at all positions of the mechanism other than said position wherein light is permitted to fall onto the film, the shutter mechanism including selectively operable means to displace the pair of bands longitudinally relative to each other in discrete steps to bring the narrow aperture in said one band into alignment with a selected narrow aperture in said other band to vary the width of the exposure slit.

4. The mechanism of claim 3, comprising a first driving member connected to drive one of the bands and a second driving member connected to drive the other of the bands, a motor for driving the said driving members, and a stepwise adjustment mechanism connected in the drive transmission between one of the driving members and the motor, whereby the longitudinal position of one of the bands relative to the other can be adjusted.

5. The mechanism of claim 3 wherein said plurality of narrow apertures formed in said other band have their center lines spaced apart by equal amounts along the length of the band and the narrow aperture in said one band being of a width axially of the one band greater than the width of the widest of said plurality of apertures longitudinally of the other band.

6. The mechanism of claim 3, in which both bands are perforated along their edges to cooperate with a driving sprocket, in which one band is narrower than the other, and a pair of coaxial guide members, one of each pair being located at each side of the focal axis, the bands passing over said guide members.

7. The mechanism of claim 6, in which one guide member is in the form of a pair of spaced-apart rollers in engagement with the edges of the wider band, and in which the other guide member is in the form of a plain cylinder of lesser diameter extending between the rollers and engaged by the narrower band and able to rotate relatively to the rollers.

8. The mechanism of claim 6, in which the driving member for the inner band is in the form of a cylindrical sprocket having roller members rotatably mounted on its ends, in which the driving member for the outer band is in the form of two driving sprockets spaced-apart by a roller member mounted for rotary movement relatively to the driving sprockets, and in which the effective diameters of all driving sprockets are the same.

9. A sequence camera incorporating the repetitively operable focal plane shutter mechanism of claim 3, the camera having a film advancing mechanism synchronised with the shutter mechanism.

10. A repetitively operable focal plane shutter mechanism for a sequence camera comprising a pair of endless opaque flexible bands, guide means located to cause each of the bands to move along a closed path first and second portions of which intersect the focal axis of the camera at right angles, one band having a narrow aperture extending perpendicularly to the direction of movement of the band, and a wide aperture having its transverse edges spaced from the narrow aperture by unequal amounts, and the other band having a narrow aperture of width greater than the narrow aperture in the said one band and a wide aperture having its edges spaced from the edges of the narrow aperture by unequal amounts, the pair of bands being disposed in relation to each other so that the narrow aperture in said one band is in alignment with and overlaps the narrow aperture in said other band to provide an exposure slit during movement of the narrow apertures along a first portion of the path intersecting the focal axis, and so that the wide apertures are aligned with each other and extend over a second portion of the path intersecting the local axis only during movement of said exposure slit along said first path portion, whereby when the mechanism is drivably mounted in a camera having a travelling film and a lens system, with the said first path portion adjacent to the film and the said second path portion adjacent to the lens system, light is permitted to fall through both pairs of aligned apertures onto the film, the first mention unequal amounts and second mentioned unequal amounts being such that when the aligned narrow apertures providing an exposure slit move along the said second portion of the path, an opaque portion of at least one of the bands occupies the said first portion of the path, and when the aligned wide apertures move along the said first portion of the path, an opaque portion of at least one band occupies the said second portion of the path so that the film is masked at all positions of the mechanism other than said position wherein light is permitted to fall onto the film, the shutter mechanism including selectively operable means to displace the pair of bands longitudinally relative to each other whereby the overlapping area of the said narrow apertures can be continuously varied, thereby varying the width of the exposure slit.

11. The mechanism of claim 10, comprising a plurality of driving members engaging said bands, a driving motor, one of said driving members being operatively connected to said driving motor, a differential mechanism drivingly connecting the other of said driving members to said motor.

12. The mechanism of claim 10, in which both bands are perforated along their edges to cooperate with a driving sprocket, in which one band is narrower than the other, and a pair of coaxial guide members, one of each pair being located at each side of the focal axis, the bands passing over said guide members.

13. The mechanism of claim 12, in which one guide member is in the form of a pair of spaced-apart rollers in engagement with the edges of the wider band, and in which the other guide member is in the form of a plain cylinder of lesser diameter extending between the rollers and engaged by the narrower band and able to rotate relatively to the rollers.

14. The mechanism of claim 12, in which the driving member for the inner band is in the form of a cylindrical sprocket having roller members rotatably mounted on its ends, in which the driving member for the outer band is in the form of two driving sprockets spaced-apart by a roller member mounted for rotary movement relatively to the driving sprockets, and in which the effective diameters of all driving sprockets are the same.

15. A sequence camera incorporating the repetitively operable focal plane shutter mechanism of claim 10, the camera having a film advancing mechanism synchronised with the shutter mechanism.

References Cited by the Examiner
UNITED STATES PATENTS

| | | | |
|---|---|---|---|
| 891,770 | 6/08 | Garfield | 95—57 |
| 994,914 | 6/11 | Folmer | 95—57 |
| 2,931,284 | 4/60 | Vinten | 95—12.5 X |

NORTON ANSHER, *Primary Examiner.*

JOHN M. HORAN, *Examiner.*